US009882456B2

United States Patent
Schröder et al.

(10) Patent No.: US 9,882,456 B2
(45) Date of Patent: Jan. 30, 2018

(54) MAGNET WHEEL

(71) Applicants: Lothar Schröder, Karben (DE); Jan Weimar, Hofheim (DE)

(72) Inventors: Lothar Schröder, Karben (DE); Jan Weimar, Hofheim (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/366,191

(22) PCT Filed: Dec. 19, 2012

(86) PCT No.: PCT/EP2012/076069
§ 371 (c)(1),
(2) Date: Jun. 17, 2014

(87) PCT Pub. No.: WO2013/092653
PCT Pub. Date: Jun. 27, 2013

(65) Prior Publication Data
US 2014/0361644 A1    Dec. 11, 2014

(30) Foreign Application Priority Data
Dec. 20, 2011    (DE) .................. 10 2011 089 243

(51) Int. Cl.
| H02K 11/00 | (2016.01) |
| H02K 1/27 | (2006.01) |
| H02K 1/30 | (2006.01) |
| H02K 29/08 | (2006.01) |
| H02K 11/21 | (2016.01) |

(52) U.S. Cl.
CPC ....... *H02K 11/0015* (2013.01); *H02K 1/2733* (2013.01); *H02K 1/30* (2013.01); *H02K 11/21* (2016.01); *H02K 29/08* (2013.01)

(58) Field of Classification Search
CPC .......... H02K 1/2733; H02K 1/30; H02K 29/08
USPC .......... 310/68 B, 43, 156.12, 156.05, 156.14, 310/156.08, 156.15, 90, 91, 67 A, 49.55,
(Continued)

(56) References Cited

U.S. PATENT DOCUMENTS

| 3,495,114 A | * | 2/1970 | Kazansky | ................ | H02K 1/16 310/179 |
| 3,728,786 A | * | 4/1973 | Lucas | .................. | H02K 1/2726 264/262 |

(Continued)

FOREIGN PATENT DOCUMENTS

| CN | 101630888 | 1/2010 |
| DE | 29 08 142 | 9/1979 |

(Continued)

OTHER PUBLICATIONS

English translation of JPH0559237; Aug. 1993; Japan; corresponding to documnet (N).*

(Continued)

*Primary Examiner* — Bernard Rojas
*Assistant Examiner* — Ahmed Elnakib
(74) *Attorney, Agent, or Firm* — Cozen O'Connor

(57) ABSTRACT

A magnet wheel for an electric motor includes a shaft and a disk made of a plastic containing magnetic particles. The disk is arranged on a carrying hub and the carrying hub is pressed onto the shaft. The carrying hub is a slotted ring around which the disk is molded on by injection molding.

7 Claims, 2 Drawing Sheets

(58) Field of Classification Search
USPC ..... 310/154.03; 29/598; 324/207.11, 207.25, 324/207.22
See application file for complete search history.

(56) References Cited

U.S. PATENT DOCUMENTS

| | | | |
|---|---|---|---|
| 4,184,576 A | | 1/1980 | Kulischenko et al. |
| 4,612,501 A | * | 9/1986 | Costello .................. F16B 21/16 324/160 |
| 5,528,095 A | * | 6/1996 | Strobl .................. H02K 1/2733 310/156.12 |
| 5,565,721 A | * | 10/1996 | Knappe .................. G01P 3/487 310/156.22 |
| 6,013,961 A | | 1/2000 | Sakamaki et al. |
| 6,198,185 B1 | * | 3/2001 | Bruhn .................... F16B 21/20 310/216.121 |
| 6,452,383 B1 | * | 9/2002 | Goedecke ................. G01P 1/00 310/156.12 |
| RE38,179 E | | 7/2003 | Elsässer et al. |
| 7,973,529 B2 | | 7/2011 | Kikuchi et al. |
| 8,436,497 B2 | * | 5/2013 | Horng ...................... H02K 1/28 310/156.08 |

FOREIGN PATENT DOCUMENTS

| | | |
|---|---|---|
| DE | 29 812 803 | 9/1998 |
| DE | 199 05 274 A1 | 8/2000 |
| DE | 103 62 051 | 7/2005 |
| EP | 0 557 564 | 9/1993 |
| EP | 1 498 911 | 1/2005 |
| EP | 2 141 785 A2 | 6/2010 |
| JP | 05-59237 | 8/1993 |
| JP | H0559237 * | 8/1993 |
| JP | 11-266568 | 9/1999 |
| JP | 2002-101583 | 4/2002 |

OTHER PUBLICATIONS

English translation for EP 1498911; Meyer Christian; Oct. 29, 2008.*
English translation for EP 1498911; Christian; Oct. 29, 2008.*
English translation of EP 1498911; christian; Oct. 29, 2008.*
Office Action dated Nov. 21, 2016 which issued in the corresponding Chinese Patent Application No. 201280062426.9.

* cited by examiner

MAGNET WHEEL

CROSS-REFERENCE TO RELATED APPLICATIONS

This is a U.S. national stage of application No. PCT/EP2012/076069, filed on 19 Dec. 2012, which claims priority to the German Application No. 10 2011 089 243.5, filed 20 Dec. 2011, the content of both incorporated herein by reference.

BACKGROUND OF THE INVENTION

1. Field of the Invention

The present invention relates to a magnet wheel for an electric motor, having a shaft and a disk made of a plastic containing magnetic particles. The disk is arranged on a support hub, and the support hub is pressed with the shaft.

2. Related Art

Such magnet wheels are used in brushless DC motors as part of position sensors and are therefore known. The disk of the magnet wheel is produced by injection molding a plastic containing iron particles onto the support hub. The support hub is a closed ring made of a suitable material, such as steel or brass. Then, the support hub, with the disk injection-molded on, is pressed onto the shaft. The disadvantage with this configuration is that, owing to manufacturing tolerances of the shaft, considerable stresses sometimes occur in the support huh when the support hub is pressed on, and these stresses reduce the life of the magnet wheel. In particularly severe cases, there is the risk of the magnet wheel being impaired, which may result in malfunctions in the position sensor.

SUMMARY OF THE INVENTION

An object of the invention is therefore to provide a magnet wheel in which loads occurring due to manufacturing do not result in individual parts being impaired.

This object is achieved in that the support hub is in the form of a slotted ring, around which the disk is formed integrally by means of injection molding.

The slotted design of the support hub enables a substantially improved response to tolerances of the shaft. The support hub thus surrounds the shaft as a type of spring and can thus expand in the case of larger shaft diameters. In this way, stresses in the support huh are markedly reduced, which increases the life of the magnet wheel. Owing to the increased toughness of the plastic, the expansion of the support hub does not substantially contribute to an increase in the stresses in the disk. A further advantage is that, owing to the slotted support hub, relatively large manufacturing tolerances in respect of the shaft diameter and the hub bore are also permissible, which simplifies manufacture.

Manufacture is very inexpensive if the ring for the support hub is rolled from tape material.

In another configuration, the ring for the support hub can be a turned or stamped part into which a slot is introduced, as has previously been the case. This is advantageous in particular when the ring is still being machined prior to being encapsulated by injection molding.

As a result of the expansion of the support hub, a relative movement of the disk and the support hub can take place. In this case, it has proven to be advantageous to connect the support hub and the disk to one another for safe torque transmission by virtue of the support hub having a notch radially on the outside.

A secure connection between the support hub and the disk without preventing the expansion of the support hub in the process is achieved with a notch when the notch is arranged in a region whose ends are arranged at least 90° away from the slot. Accordingly, no notch is arranged in each case at least 90° to the left and to the right of the slot. In this region, a relative movement between the disk and the support hub can occur during expansion. Stresses are thus minimized.

An intimate connection between the support hub and the disk is achieved with a. notch. in the form of at least one impressed portion, preferably in the form of a knurl.

In another configuration, the notch can be produced in a particularly simple manner when it is a single cutout in the support hub, which is arranged opposite the slot. A single cutout is often sufficient owing to the low torque to be transmitted. In addition, advantageously such wide regions of the support hub are provided that a relative movement between the plastic and the support hub is permitted.

For relatively large torque transmissions, two to four cutouts can be arranged in the support hub, which are arranged symmetrically with respect to the slot.

BRIEF DESCRIPTION OF THE DRAWINGS

The invention will be explained in more detail with reference to an exemplary embodiment. In the drawings.

DETAILED DESCRIPTION OF THE PRESENTLY PREFERRED EMBODIMENTS

Figure 1:
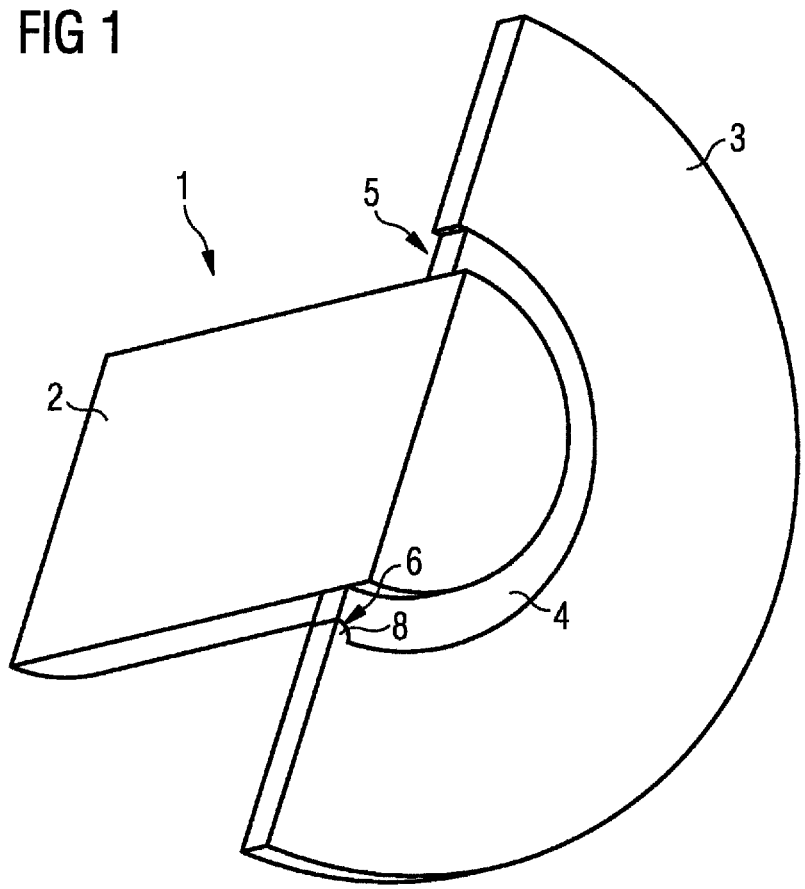
FIG. 1 shows a magnet wheel in a half-section.
Figure 3:
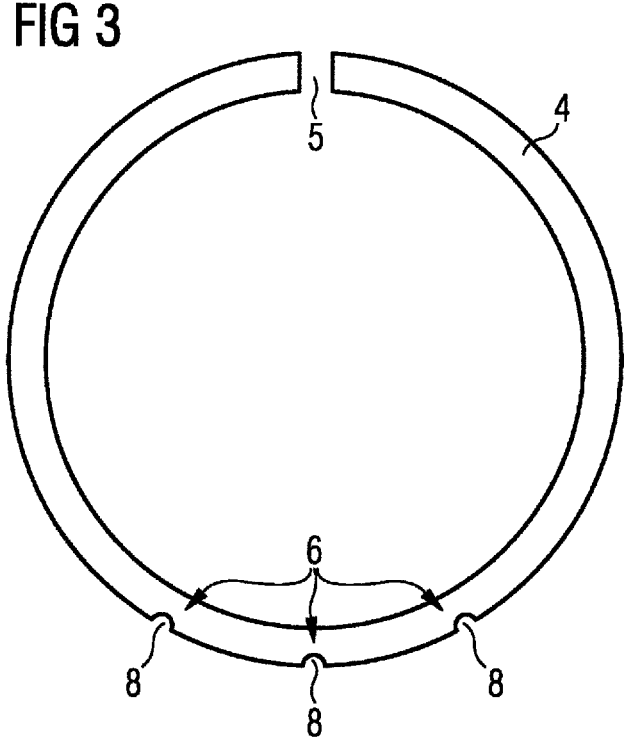

As seen in FIG. 1, a magnet wheel 1 comprises a shaft 2, which can be the shaft of an electronically commutated electric motor, and a disk 3 made of ferrite-bonded plastic. The plastic is integrally formed on a support hub 4 by injection molding. The support hub has a slot 5, which is arranged in the section plane for improved clarity. As illustrated in FIGS. 1 and 3, the support hub 4 has a notch 6 that may be in the form of a cutout 8 radially on the outside opposite the slot 5 and thus at a distance of 180°. During injection-molding of the ferrite-bonded plastic, the ferrite-bonded plastic fills the notch 6 and thus produces an intimate compound structure with the support hub 4. When the support hub 4 is pressed with the disk 3 onto the shaft 2, the support hub 4 can expand, wherein this may result in relative movements between the support hub 4 and the disk 3 in the regions to the right and left of the slot 5.

Figure 2:
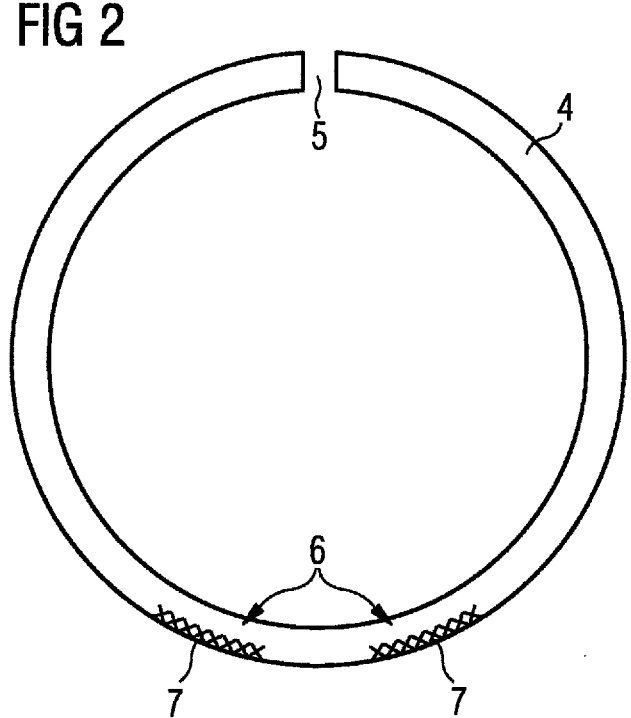
FIGS. 2 and 3 show further embodiments of the support hub.

The support hub 4 is illustrated without the disk and the shaft in FIGS. 2 and 3. FIG. 2 shows the support hub 4 with a notch 6 in the form of two knurls 7. The knurls 7 are arranged in a region symmetrically opposite the slot 5 and extends over 60°. The knurls 7 each extend over a region of 20° and have a distance from one another of 20° C. The knurls 7 thus have a distance from the slot 5 of 150°. The support hub 4 in FIG. 3 has a notch 6 in the form of three cutouts 8 arranged symmetrically with respect to the slot 5, which cutouts have a distance from one another of 30°.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A magnet wheel for an electric motor, comprising:
a shaft (2);
a disk (3) made of a plastic containing magnetic particles; and
an annular support hub (4) on which the disk (3) is arranged, the annular support hub (4) being pressed with the shaft (2), the disk (3) being formed integrally around the annular support hub (4),
wherein the annular support hub (4) has a slot (5), the slot (5) defining a circumferential gap in the annular support hub (4), and
wherein the support hub (4) has only a single notch (6) radially on an outside portion of the support hub (4), the single notch (6) comprising one selected from the group of:
one to four cutouts (8) in the support hub, and
two knurls (7),
the single notch being arranged exclusively in a region, the ends of the region being arranged at least 90° away from the slot (5), no notch being formed in any region less than 90° to the left or right of the slot (5).

2. The magnet wheel as claimed in claim 1, wherein the support hub (4) is rolled from tape material.

3. The magnet wheel as claimed in claim 1, wherein the support hub (4) is a turned or stamped part into which the slot (5) is introduced.

4. The magnet wheel as claimed in claim 1, wherein in a case in which the notch (6) comprises the two knurls, the notch (6) is in the form of at least two impressed portions.

5. The magnet wheel as claimed in claim 1, wherein in a case in which the notch (6) comprises a single cutout (8) in the support hub (4), the single cutout (8) is arranged opposite the slot (5).

6. The magnet wheel as claimed in claim 1, wherein in a case in which the notch (6) comprises two to four cutouts (8) in the support hub (4), the two to four cutouts are arranged symmetrically with respect to the slot (5).

7. The magnet wheel as claimed in claim 1, wherein the disk (3) is formed around the support hub (4) by injection molding.

* * * * *